United States Patent [19]
Orton

[11] Patent Number: 5,324,056
[45] Date of Patent: Jun. 28, 1994

[54] HIGH PERFORMANCE AUTOMOBILE SUSPENSION

[76] Inventor: Kevin R. Orton, 940 Calle Negocio, San Clemente, Calif. 92672

[21] Appl. No.: 109,951

[22] Filed: Aug. 23, 1993

[51] Int. Cl.$^5$ .................. B60G 3/26; B60G 21/05; B62D 17/00
[52] U.S. Cl. ................ 280/112.1; 280/772; 280/661; 280/675
[58] Field of Search ............ 280/661, 663, 666, 675, 280/772, 111, 112.1, 112.2, 688, 689, 724, 725, 726, 693, 696, 698, 701

[56] References Cited

U.S. PATENT DOCUMENTS

| | | | |
|---|---|---|---|
| 3,711,113 | 1/1973 | Stammreich | 280/675 |
| 4,373,743 | 2/1983 | Parsons, Jr. | 280/661 |
| 4,854,603 | 8/1989 | Scaduto | 280/661 |
| 4,927,169 | 5/1990 | Scaduto | 280/661 |

FOREIGN PATENT DOCUMENTS

| | | | |
|---|---|---|---|
| 0285110 | 12/1986 | Japan | 280/724 |
| 1526970 | 10/1978 | United Kingdom | 280/661 |

*Primary Examiner*—Margaret A. Focarino
*Assistant Examiner*—Peter English
*Attorney, Agent, or Firm*—Loyal M. Hanson

[57] ABSTRACT

A suspension for a wheeled vehicle includes a chassis, left and right hub carriers, and left and right support members for supporting the left and right hub carriers on the chassis in opposite positions relative to a reference axis through the chassis that is vertical when the chassis is level and for enabling the hub carriers to individually move up and down relative to a reference plane that is perpendicular to the reference axis. Left and right linkages are provided for cooperating with the left and right support members in order to control chamber as the left and right hub carriers move up and down relative to the reference plane. The suspension also includes differential camber control components for controlling the camber of the left and right hub carriers according to any difference in the positions of the left and right hub carriers relative to the reference plane in order to offset for chassis roll. The differential camber control components include a moveable linkage-connecting component that is mounted moveably on the chassis and connected to an inboard end of the left linkage and an inboard end of the right linkage. The differential camber control components also include left and right auxiliary linkages connecting the moveable linkage-connecting component to the left and right support members. That is done so that the moveable linkage-connecting component responds to any difference in the position of the left and right hub carriers relative to the reference plane by moving relative to the chassis toward the one of the left and right hub carriers that is lower relative to the reference plane, thereby to offset for chassis roll.

4 Claims, 3 Drawing Sheets

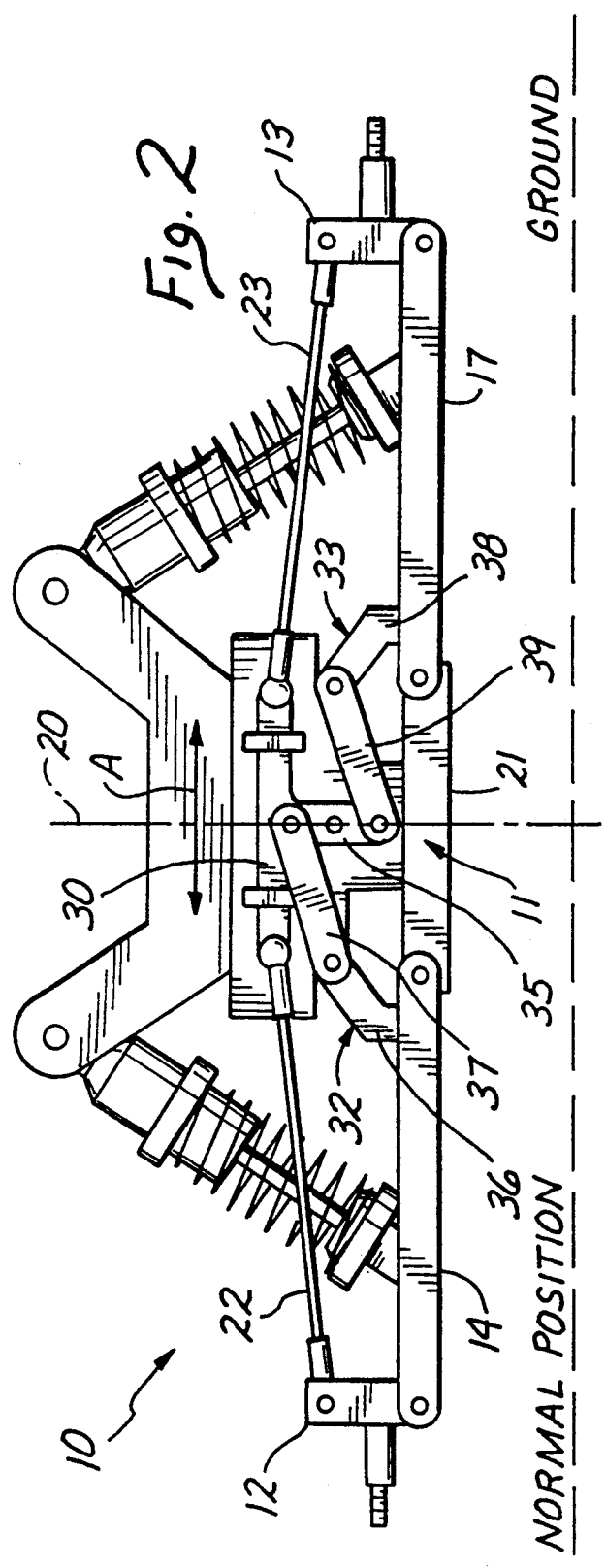
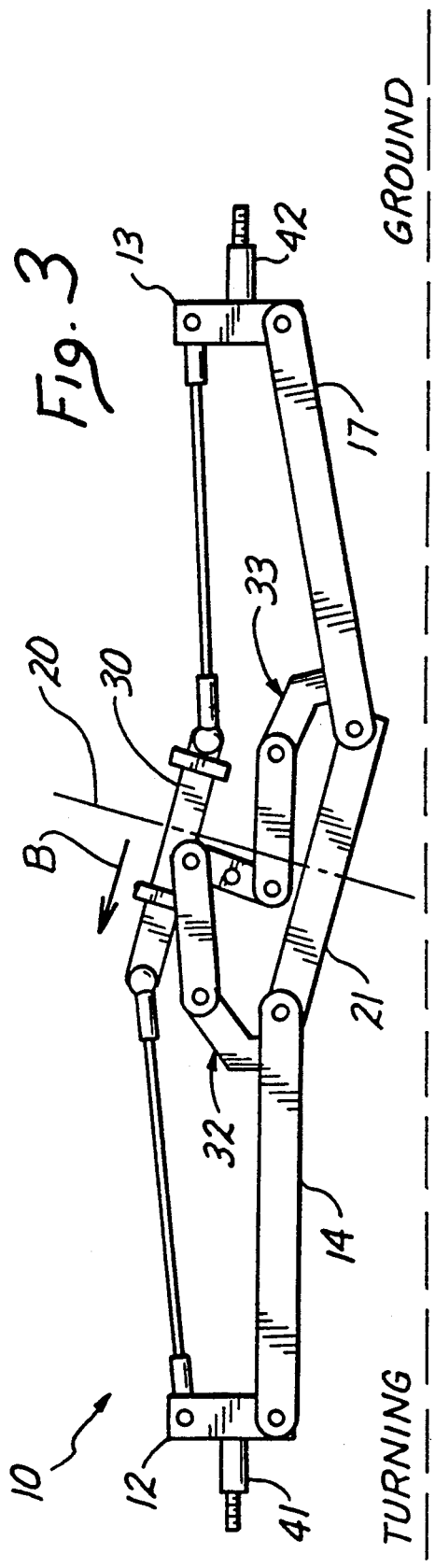

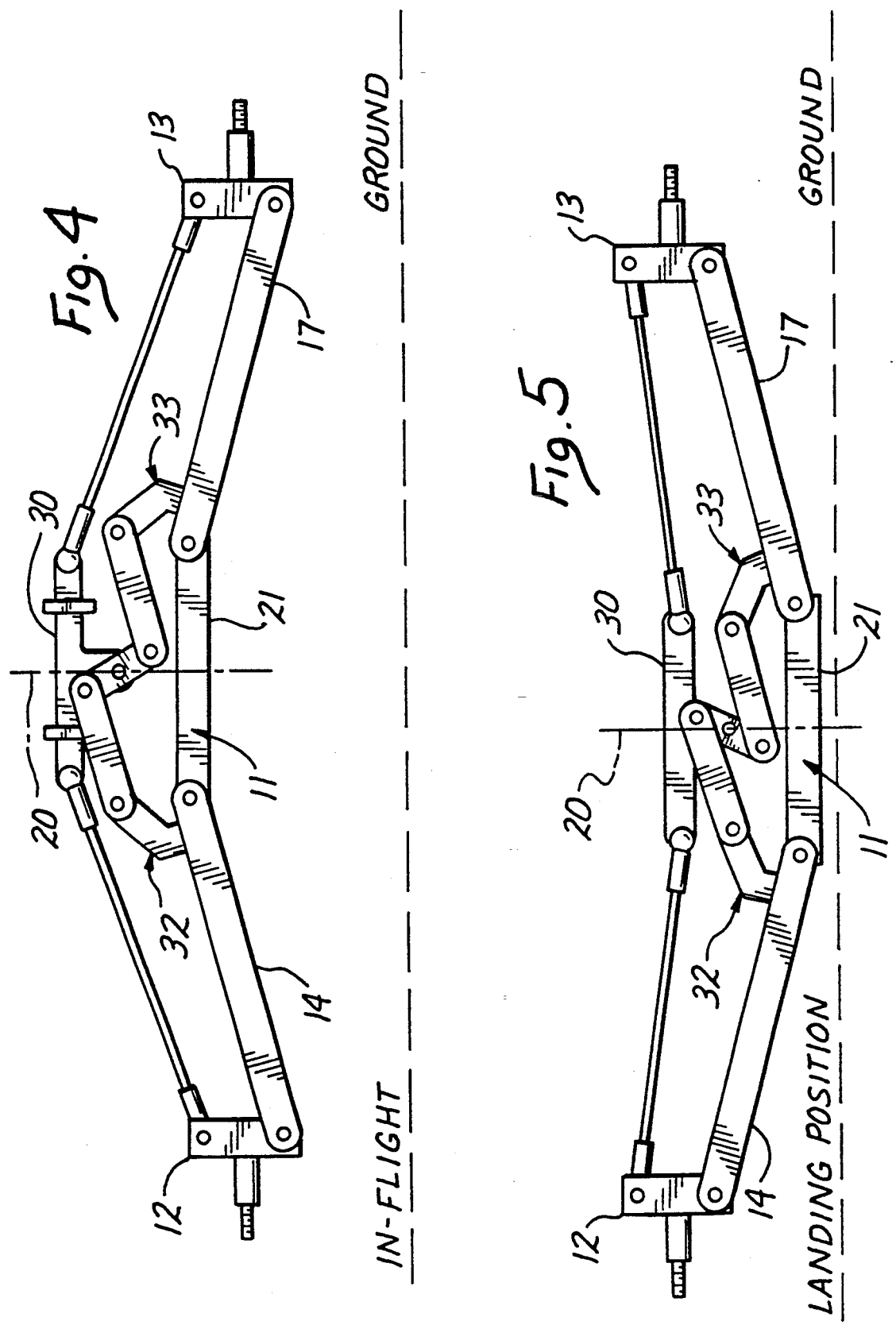

5,324,056

HIGH PERFORMANCE AUTOMOBILE SUSPENSION

BACKGROUND OF THE INVENTION

1. Technical Field

This invention relates generally to automobile suspensions, and more particularly to a high performance automobile suspension that helps maintain a desired camber during various driving maneuvers and roadway conditions.

2. Background Information

Recall that automobile suspensions, including the suspensions of cars, trucks, radio controlled (R/C) models, and other wheeled vehicles, often include a chassis, left and right hub carriers, left and right upper linkages, and left and right lower linkages. The hub carriers provide the structure upon which the wheels are mounted, and the upper and lower linkages support the hub carriers on the chassis.

The upper and lower linkages may take the form of A-arms or other known forms of suspension linkages. They cooperate to support the hub carriers on the chassis, to enable up and down movement of the hub carriers, and to control hub carrier camber. For that purpose, the upper and lower linkages have outboard ends pivotally connected to the hub carriers, inboard ends pivotally connected to fixed mounting points on the chassis, and relative lengths chosen to control camber as desired during hub carrier travel.

Linkage lengths may be chosen, for example, to maintain constant camber during up-and-down hub carrier travel. They may be chosen, instead, to provide positive or negative camber change during hub carrier travel. That may be done to offset chassis roll during a high speed cornering maneuver in order to keep the outside tire flat on the roadway. But existing suspensions do not do both and so a better suspension is needed.

SUMMARY OF THE INVENTION

This invention solves the problems outlined above by providing a new and improved suspension with a floating linkage mounting that offsets for chassis roll. The floating mounting is accomplished with a moveable linkage-connecting component that connects inboard ends of the left and right linkages. That enables the suspension to maintain a constant camber as the hub carriers travel up and down on a flat roadway and still offset for chassis roll in the curves.

In terms of the claim language that is subsequently developed, a suspension constructed according to the invention includes a chassis, left and right hub carriers, and means in the form of left and right support members for supporting the left and right hub carriers on the chassis in opposite positions relative to a reference axis through the chassis that is vertical when the chassis is level and for enabling the hub carriers to individually move up and down relative to a reference plane that is perpendicular to the reference axis. The suspension also includes means in the form of left and right linkages for cooperating with the left and right support members in order to control camber as the left and right hub carriers move up and down relative to the reference plane. Those components may be similar in some respects to components of existing suspensions.

According to the major aspect of the invention, the suspension also includes differential camber control means (i.e., chassis-roll camber compensation means). It serves to control the camber of the left and right hub carriers according to any difference in the positions of the left and right hub carriers relative to the reference plane. That is done to offset for chassis roll.

The differential camber control means includes a moveable linkage-connecting component. It is mounted moveably on the chassis and connected to inboard ends of the left and right linkages. Left and right auxiliary linkages connect the moveable linkage-connecting component to the left and right support members. That is done so that the moveable linkage-connecting component responds to any difference in the position of the left and right hub carriers relative to the reference plane by moving relative to the chassis toward the lower one. That offsets for chassis roll.

The foregoing and other objects, features, and advantages of the invention become more apparent upon reading the following detailed description with reference to the illustrative drawings.

BRIEF DESCRIPTION OF THE DRAWINGS

FIG. 2 is a diagrammatic rear view of the suspension in a normal position;

FIG. 3 is a diagrammatic rear view of the suspension with the chassis rolling to the right;

FIG. 4 is a diagrammatic rear view of the suspension in flight; and

FIG. 5 is a diagrammatic rear view of the suspension landing.

DESCRIPTION OF THE PREFERRED EMBODIMENTS

Figure 1:
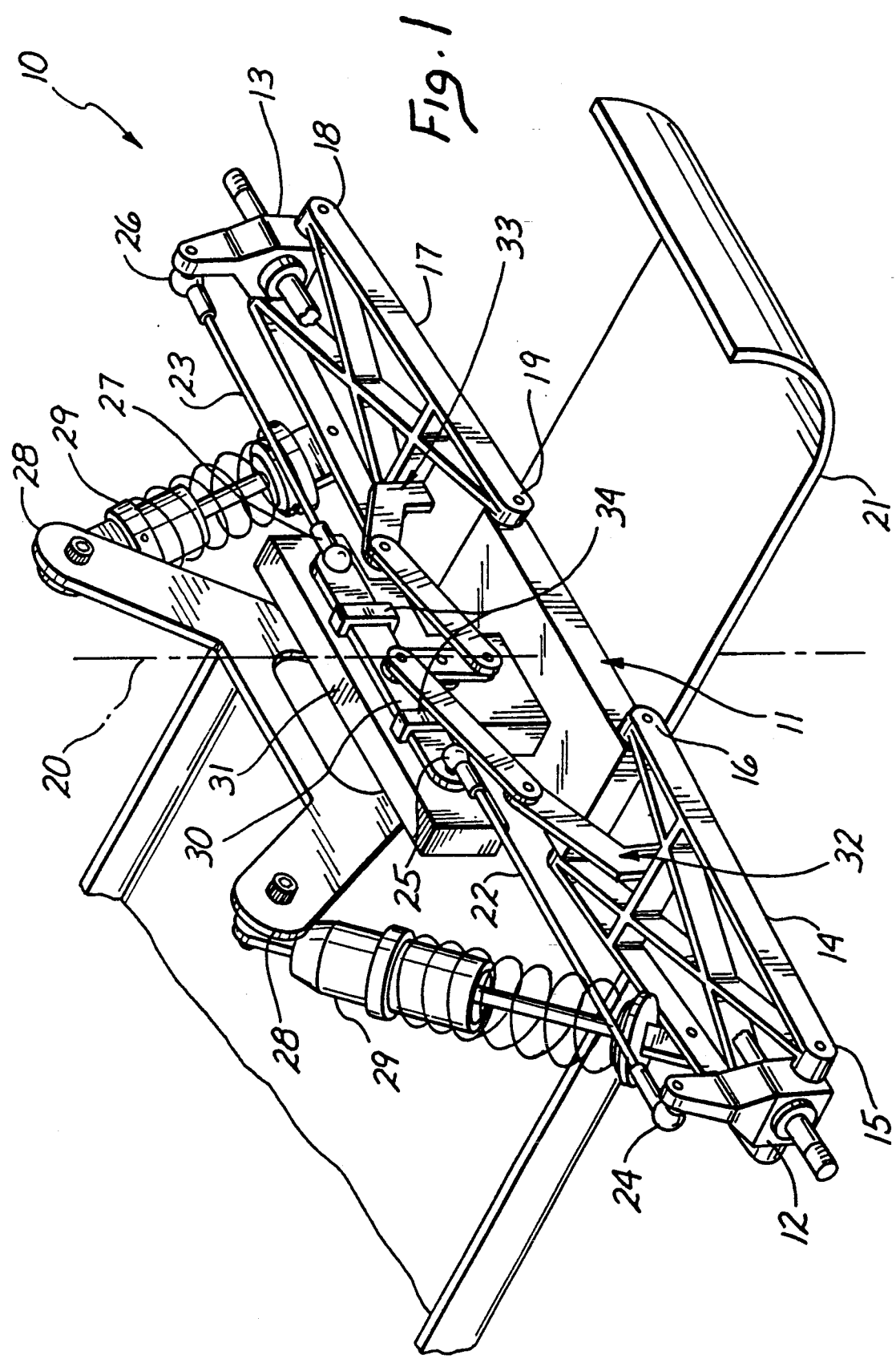
FIG. 1 of the drawings is a pictorial rear view of a rear suspension constructed according to the invention.

FIG. 1 of the drawings is a pictorial rear view of a suspension 10 constructed according to the invention. The suspension 10 is a part of a radio controlled model, but it is intended that a suspension constructed according to the invention may be used in any of various wheeled vehicles without departing from the broader scope of the claims.

Generally, the suspension 10 includes a chassis 11, a left hub carrier 12 a right hub carrier 13, and various components for mounting the hub carriers 12 and 13 on the chassis 11. A left support member 14 having an outboard end 15 pivotally connected to the hub carrier 12 and an inboard end 16 pivotally connected to the chassis 11 serves to support the left hub carrier 12 on the chassis. Similarly, a right support member 17 having an outboard end 18 pivotally connected to the hub carrier 13 and an inboard end 19 pivotally connected to the chassis 11 serves to support the right hub carrier 13 on the chassis. Supported that way on the chassis 11, the hub carriers 12 and 13 serve as mountings for wheels.

The support members 14 and 17 may take any of suitable forms (e.g., the illustrated rigid A-arms) and they may be pivotally connected to the chassis 11 and hub carriers 12 and 13 using known components and techniques. They support the hub carriers 12 and 13 in opposite positions relative to a reference axis 20 through the chassis 11 that is vertical when the chassis is level. FIG. 1 shows the chassis in a level position and the reference axis 20 vertical. The left hub carrier 12 occupies a position to the left of the reference axis 20 and the hub carrier 13 occupies a position to the right of the reference axis 20.

That terminology is useful in describing another function of the support members 14 and 17 because they also serve the known function of enabling the hub carriers to individually move up and down relative to a reference plane that is perpendicular to the reference axis 20. For purposes of this description, the reference plane may be thought of as the underside of the chassis 11 and it is designated with a reference numeral 21.

The suspension 10 also includes left and right linkages 22 and 23 that cooperate with the left and right support members 14 and 17 in order to control camber as the left and right hub carriers 12 and 13 move up and down relative to the reference plane 21. The left and right linkages 22 and 23 are rigid members that may take any of various forms, including A-arms and the illustrated rods. The left linkage 22 has an outboard end 24 pivotally connected to the left hub carrier 12 and an inboard end 25 connected in a manner subsequently described. Similarly, the right linkage 23 has an outboard end 26 pivotally connected to the right hub carrier 13 and an inboard end 27 connected as subsequently described.

The foregoing components may be similar in some respects to the components of existing suspensions. For radio controlled models, the components may be fabricated from molded plastic. For full-size automobiles and other full-size wheeled vehicles, they may be made of suitable metal alloys for the strength and rigidity desired. In addition, the chassis 11 may include struts 28 for mounting shock absorbers 29 in a known way.

According to a major aspect of the invention, the suspension 10 includes differential camber control means for controlling the camber of the left and right hub carriers 12 and 13. Camber is controlled according to any difference in the positions of the left and right hub carriers 12 and 13 relative to the reference plane 21. That is done to offset for chassis roll.

The differential camber control means includes a moveable linkage-connecting component 30 that is mounted moveably on the chassis (e.g., on a mounting block 31 that is part of the chassis 11). The moveable linkage-connecting component 30 is a rigid member that is pivotally connected to the inboard end 25 of the left linkage 22 and the inboard end 27 of the right linkage 23. As the chassis 11 rolls, the linkage-connecting component 30 moves relative to the chassis 11 and the reference axis 20 toward one of the hub carriers 12 and 13 that is lower relative to the reference plane 21. That action offsets for chassis roll.

Left and right auxiliary linkages 32 and 33 cause the linkage-connecting component 30 to slide left and right relative to the mounting block 31 through mountings 34. The mountings 34 (FIG. 1) slidably mount the linkage-connecting component 30 on the mounting block 31 so that the linkage-connecting component 30 can move left and right along a path extending between the left and right linkages 22 and 23 as depicted by a double-headed arrow A in FIG. 2. Any of various suitable mountings may be used to moveably mount the linkage-connecting component 30 so that it functions that way.

The illustrated left and right auxiliary linkages 32 and 33 connect to the linkage-connecting component 30 via a common link 35 (FIG. 2) that is pivotally connected to the linkage-connecting component 30. The left auxiliary linkage 32 includes a first link 36 and a second link 37. The first link 36 is rigidly connected to the left support member 14 and pivotally connected to the second link 37. The second link 37 is pivotally connected to the common link 35. Similarly, the right auxiliary linkage 33 includes a first link 38 and a second link 39. The first link 38 is rigidly connected to the right support member 17 and pivotally connected to the second link 38, and the second link 38 is pivotally connected to the common link 35.

FIG. 2 shows the suspension 10 in a normal position, as it would be if the chassis 11 were at rest upon a level roadway (i.e., ground). The wheels and tires are omitted for illustrative convenience. In such a normal position, the reference axis 20 is vertical and both hub carriers are at a common level relative to the reference plane 21. Camber is determined according to the length of the left and right linkages 22 and 23.

FIG. 3 shows the suspension 10 in a turning position, as it would be rounding a left turn on a level roadway. The chassis 11 rolls to the right, the reference axis 20 rolls with the chassis 11 to the non-vertical position illustrated, and the reference plane 21 rolls with the chassis 11 to the non-horizontal position illustrated. In that position, the left hub carrier 12 is lower than the right hub carrier 13 relative to the reference plane 21, and so the linkages 32 and 33 move the linkage-connecting component 30 to the left relative to the reference axis 20 as depicted by an arrow B in FIG. 3, toward the lower one of the hub carriers 12 and 13. That results in differential camber control that keeps left and right axles 41 and 42 in desired alignment with the ground. Based upon the foregoing and subsequent descriptions, one of ordinary skill in the art can adjust the lengths and overall configuration of the left and right auxiliary linkages 32 and 33 to obtain the amount of camber compensation and control desired.

FIG. 4 shows the suspension 10 in an in-flight position, as it might appear after hitting an abrupt bump. The reference axis 20 is vertical and both hub carriers 12 and 13 are at a common level relative to the reference plane 21. As a result, the linkage-connecting component 30 remains in the same position relative to the reference axis 20 that it occupies when the suspension is in the normal position described above. There is no differential camber compensation or control.

FIG. 5 shows the suspension 10 in a landing position, as it might appear after falling back to the ground after the bump. The reference axis 20 is vertical and both hub carriers 12 and 13 are at a common level relative to the reference plane 21. As a result, the linkage-connecting component 30 remains in the same position relative to the reference axis 20 that it occupies when the suspension is in the normal position described above. There is no differential camber compensation or control.

Thus, the invention provides a floating linkage mounting that offsets for chassis roll. The floating linkage mounting is accomplished with a moveable linkage-connecting component that connects inboard ends of the left and right linkages. That enables the suspension to maintain a constant camber as the hub carriers travel up and down on a flat roadway and still offset for chassis roll in the curves.

Although an exemplary embodiment has been shown and described, one or ordinary skill in the art may make many changes, modifications, and substitutions without necessarily departing from the spirit and scope of the invention.

What is claimed is:

1. A suspension, comprising:
   a chassis, left and right hub carriers, and means in the form of left and right support members for supporting the left and right hub carriers on the chassis in opposite positions relative to a reference axis through the chassis that is vertical when the chassis is level and for enabling the hub carriers to individually move up and down relative to a reference plane that is perpendicular to the reference axis;

means in the form of left and right linkages for cooperating with the left and right support members in order to control camber as the left and right hub carriers move up and down relative to the reference plane; and differential camber control means for controlling the camber of the left and right hub carriers according to any difference in the positions of the left and right hub carriers relative to the reference plane in order to offset for chassis roll;

the differential camber control means including a moveable linkage-connecting component that is mounted moveably on the chassis and connected to an inboard end of the left linkage and an inboard end of the right linkage; and the differential camber control means also including means in the form of left and right auxiliary linkages connecting the moveable linkage-connecting component to the left and right support members so that the moveable linkage-connecting component responds to any difference in the position of the left and right hub carriers relative to the reference plane by moving relative to the chassis toward the one of the left and right hub carriers that is lower relative to the reference plane, thereby to offset for chassis roll.

2. A suspension as recited in claim 1, wherein the left and right support members take the form of A-arms.

3. A suspension as recited in claim 1, wherein the left and right support members are mounted lower than the left and right linkages relative to the reference plane.

4. A suspension as recited in claim 1, wherein the movable linkage-connecting component is slidably mounted on the chassis for movement back and forth along a path between the hub carriers.

* * * * *